United States Patent
Kaste

(10) Patent No.: US 11,448,524 B2
(45) Date of Patent: Sep. 20, 2022

(54) MULTIPOLE MAGNET FOR USE WITH A PITCHED MAGNETIC SENSOR

(71) Applicant: John Kaste, Fort Wayne, IN (US)

(72) Inventor: John Kaste, Fort Wayne, IN (US)

(73) Assignee: Phoenix America Inc., Fort Wayne, IN (US)

(*) Notice: Subject to any disclaimer, the term of this patent is extended or adjusted under 35 U.S.C. 154(b) by 0 days.

(21) Appl. No.: 15/093,451

(22) Filed: Apr. 7, 2016

(65) Prior Publication Data

US 2017/0292855 A1    Oct. 12, 2017

(51) Int. Cl.
G01D 5/14    (2006.01)

(52) U.S. Cl.
CPC ................... G01D 5/142 (2013.01)

(58) Field of Classification Search
CPC ...... G01D 5/142; G01D 5/145; G01D 5/2451; G01R 33/0005; G01R 33/06; H01L 21/68; G06F 21/79
USPC ...... 324/200, 207.13–207.25, 251, 111, 7 H, 324/545, 529, 500
See application file for complete search history.

(56) References Cited

U.S. PATENT DOCUMENTS

| | | | |
|---|---|---|---|
| 4,405,286 A * | 9/1983 | Studer | F04B 19/12 310/90.5 |
| 4,417,332 A | 11/1983 | Kelleher | |
| 4,801,830 A | 1/1989 | Ogino | |
| 5,351,555 A | 10/1994 | Garshells | |
| 5,465,627 A | 11/1995 | Garshells | |
| 5,466,904 A | 11/1995 | Pfeiffer | |
| 5,520,059 A | 5/1996 | Garshells | |
| 5,706,572 A | 1/1998 | Garshells | |
| 5,815,091 A | 9/1998 | Dames | |
| 5,887,335 A | 3/1999 | Garshells | |
| 5,926,676 A | 7/1999 | Snelling | |
| 5,930,554 A | 7/1999 | Godlove | |
| 5,933,683 A | 8/1999 | Snelling | |
| 6,215,206 B1 * | 4/2001 | Chitayat | B01D 63/02 310/12.14 |
| 6,236,883 B1 | 5/2001 | Ciaccio | |
| 6,323,641 B1 | 11/2001 | Allwine | |
| 6,593,734 B1 | 7/2003 | Gandel | |
| 6,844,647 B2 * | 1/2005 | Horber | H02K 21/16 310/112 |
| 6,992,482 B2 | 1/2006 | Shay | |
| 7,049,722 B2 | 5/2006 | Rose | |

(Continued)

FOREIGN PATENT DOCUMENTS

| | | | |
|---|---|---|---|
| JP | 2002-228485 A | 8/2002 | |
| JP | 2003-097971 A | 4/2003 | |

(Continued)

OTHER PUBLICATIONS

International Search Report and Written Opinion; PCT/US2017/026072; dated Jun. 29, 2017; 13 pages.

Primary Examiner — Douglas X Rodriguez
Assistant Examiner — Trung Nguyen
(74) Attorney, Agent, or Firm — Carson LLP; Michael D. Smith

(57) ABSTRACT

A position encoder comprising a cylindrical rotor; first and second magnetic poles having opposite polarity helically disposed about the inner or outer diameter of the rotor; first and second Hall sensors disposed within a distance suitable for the Hall sensors to detect the magnet poles.

26 Claims, 13 Drawing Sheets

(56) References Cited

U.S. PATENT DOCUMENTS

| | | |
|---|---|---|
| 7,062,840 B2 | 6/2006 | Schroeder |
| 7,229,746 B2 | 6/2007 | Schroeder |
| 7,367,257 B2 | 5/2008 | Kadlicko |
| 7,467,057 B2 | 12/2008 | Sheiretov |
| 7,593,798 B2 | 9/2009 | Yabe |
| 7,629,941 B2 | 12/2009 | Pendry |
| 7,733,289 B2 | 6/2010 | Pendry |
| 7,966,075 B2 | 6/2011 | Johnson |
| 7,999,695 B2 | 8/2011 | Rodney |
| 8,026,862 B2 | 9/2011 | Pendry |
| 8,050,883 B2 | 11/2011 | Sheiretov |
| 8,103,338 B2 | 1/2012 | Harlev |
| 8,169,185 B2 | 5/2012 | Partovi |
| 8,446,046 B2 | 5/2013 | Fells |
| 8,447,414 B2 | 5/2013 | Johnson |
| 8,457,760 B2 | 6/2013 | Johnson |
| 8,509,913 B2 | 8/2013 | Johnson |
| 8,571,647 B2 | 10/2013 | Harlev |
| 8,593,242 B2 | 11/2013 | Fullerton |
| 8,629,652 B2 | 1/2014 | Partovi |
| 8,629,654 B2 | 1/2014 | Partovi |
| 8,643,454 B2 | 2/2014 | Fullerton |
| 8,717,131 B2 | 5/2014 | Fullerton |
| 8,744,566 B2 | 6/2014 | Harlev |
| 8,751,013 B2 | 6/2014 | Johnson |
| 8,779,877 B2 | 7/2014 | Fullerton |
| 8,853,892 B2 | 10/2014 | Fells |
| 8,855,785 B1 | 10/2014 | Johnson |
| 8,870,899 B2 | 10/2014 | Beisel |
| 8,888,526 B2 | 11/2014 | Burris |
| 8,890,470 B2 | 11/2014 | Partovi |
| 8,890,514 B2 | 11/2014 | Masson |
| 8,896,264 B2 | 11/2014 | Partovi |
| 8,901,881 B2 | 12/2014 | Partovi |
| 8,947,047 B2 | 2/2015 | Partovi |
| 9,037,258 B2 | 5/2015 | Johnson |
| 9,048,599 B2 | 6/2015 | Burris |
| 9,071,019 B2 | 6/2015 | Burris |
| 9,106,083 B2 | 8/2015 | Partovi |
| 9,112,362 B2 | 8/2015 | Partovi |
| 9,112,364 B2 | 8/2015 | Partovi |
| 9,113,809 B2 | 8/2015 | Barlev |
| 9,136,654 B2 | 9/2015 | Matzen |
| 9,147,963 B2 | 9/2015 | Balcer |
| 9,153,911 B2 | 10/2015 | Burris |
| 9,166,348 B2 | 10/2015 | Burris |
| 9,172,154 B2 | 10/2015 | Burris |
| 9,178,369 B2 | 11/2015 | Partovi |
| 9,190,744 B2 | 11/2015 | Burris |
| 9,197,194 B2 | 11/2015 | Reedy |
| 9,985,497 B2 * | 5/2018 | Whiteley ............... H02K 7/06 |
| 2002/0008491 A1 * | 1/2002 | Aoshima ............... H02K 7/116 |
| | | 318/696 |
| 2008/0265807 A1 * | 10/2008 | Rose ................ G01D 5/2449 |
| | | 318/135 |
| 2010/0213927 A1 * | 8/2010 | Mehnert ............... G01D 5/145 |
| | | 324/207.2 |
| 2011/0122519 A1 * | 5/2011 | Kageyama ............ G02B 7/10 |
| | | 359/824 |
| 2011/0309824 A1 * | 12/2011 | Takahashi ........... F16C 41/007 |
| | | 324/207.13 |
| 2012/0022458 A1 | 1/2012 | Oh et al. |
| 2014/0320247 A1 * | 10/2014 | Fullerton ............ H01F 7/0278 |
| | | 335/306 |
| 2015/0077033 A1 * | 3/2015 | Lee ..................... H02K 37/00 |
| | | 318/696 |
| 2016/0254708 A1 * | 9/2016 | So ......................... H02K 1/17 |
| | | 310/154.02 |

FOREIGN PATENT DOCUMENTS

| | | |
|---|---|---|
| JP | 2009-080058 A | 4/2009 |
| KR | 10-2007-0017207 A | 2/2008 |

* cited by examiner

MULTIPOLE MAGNET FOR USE WITH A PITCHED MAGNETIC SENSOR

BACKGROUND

1. Field of the Invention

The present invention relates to non-contact motion sensors, and, more particularly, to a moving target with a helical magnetic pole pattern for use with a pitched magnetic sensor.

2. Description of the Related Art

An encoder is a sensor of mechanical motion that generates digital signals in response to motion. Modern designs favor non-contact sensing methods, either magnetic or optical, for improved reliability, performance, and life expectancy. As an electromechanical device, an encoder is able to provide motion control system users with information concerning position, velocity, and direction. There are two different types of encoders: linear and rotary. A linear encoder responds to motion along a path, while a rotary encoder responds to rotational motion.

Linear and rotary encoders are further broken down into two main types: the absolute encoder and the incremental encoder. An incremental encoder generates a train of pulses that can be used to determine position and speed. The incremental signal consists of two phase shifted, square wave signals. The phase shift is required to recognize of the direction of rotation. An absolute encoder generates unique bit configurations to track positions directly. The construction of these two types of encoders is quite similar. However, they differ in physical properties and the interpretation of movement.

The output of incremental rotary encoders is measured in pulses per revolution which is used to keep track of position or determine speed. A single channel output is commonly implemented in applications in which direction of movement is not significant. In situations in which direction sensing is important, a two-channel, quadrature output is used. The two channels, A and B, are commonly 90 electrical degrees out of phase, and electronic components determine the direction of magnet movement based off the phase relationship between the two channels. The position of an incremental encoder is calculated by adding up all the pulses with a counter.

A setback of the incremental encoder is count loss which occurs during power loss. When restarting, the equipment must be referenced to a home position to reinitialize the counter. However, there are some incremental encoders that come equipped with a third channel called an index channel. The index channel produces a single signal pulse per revolution of the encoder shaft and is often used as a reference marker. The reference marker is then denoted as a starting position which can resume counting or position tracking.

Absolute encoders utilize output signals in digital bits that correspond to a unique magnet position. As a result, each position has its own unique bit configuration. The absolute signal consists of discrete coded binary values and may be from 4 to 16 bits wide. In application, absolute encoders are required if a particular setting must be recognized and available after the system powers down.

A common type of absolute encoder is known as the multi-track type. In this type, an absolute pattern is formed by a plurality of parallel tracks each having an incremental pattern of different pitches, which is called as a multi-track type absolute pattern graduation scale. A detector for reading the multi-track type absolute pattern graduation scale includes a plurality of sensors arranged in the respective positions basically corresponding to that of each track one by one, and an absolute position signal of "binary number of good order" having binary code or gray code is assembled from the outputs of the sensors.

An exemplary prior art single track may be constructed with a single track of a mark-space pattern of irregular pitch which is called single-track type absolute pattern graduation scale. In the single-track absolute pattern graduation, "1" and "0" of a special sequence of binary numbers such as Full Periodic Sequence or M-Sequence are replaced by two kinds of minimum reading units having different physical characteristics, and arranged on the track in a single line. On the detector, a plurality of sensors are arranged in a single line with a pitch fundamentally of the minimum reading unit length along the single-track type absolute pattern graduation scale, and an absolute position signal consisting of "different binary numbers having random order" is assembled from the outputs of said plurality of sensors.

A rotary magnetic encoder consists of two parts: a rotor and a sensor. The rotor turns with a shaft and contains alternating evenly spaced north and south magnetic poles around its circumference. The sensor detects shifts in the position of the poles. There are many methods of detecting magnetic field changes, but the two primary types used in encoders are: Hall effect and magnetoresistive. Hall effect sensors (also referred to herein as Hall sensors or Hall devices) are magnetic sensors that work by detecting a change in voltage by magnetic deflection of electrons, and outputting one cycle of information per magnetic pole pair (one north pole and one south pole). Magnetoresistive sensors are magnetic sensors that detect a change in resistance caused by a magnetic field, and output one cycle of information per magnetic pole pair (one north pole and one south pole).

The simplest configuration of a magnetic encoder comprises a single magnet, with a single set of north and south poles on opposite edges of the rotor, and a single magnetic sensor. The device produces a single sine wave output with a frequency equal to the rotational speed of the shaft. With a second magnetic sensor set at a physical distance from the first magnetic sensor to achieve an electrical output that is 90° out of phase with the output of the first sensor, it is possible to detect the direction of rotation and to interpolate the absolute position of the shaft from the sine and cosine signals. Positioning one magnetic sensor half a pole's distance ahead of the other magnetic sensor causes the first sensor's output to either lead or lag the second sensor's by 90° (with respect to the electrical waveforms output from the sensors). This lead or lag is then detected by the flip-flop, whose output is 0 for rotation in one direction and 1 for rotation in the other.

For incremental encoders, the sinusoidal outputs from the sensors are converted to square waves so the resulting quadrature waveforms can only be encoded to one of four possible angular positions. The sine and cosine signals can be furthered processed using interpolation to further increase the resolution of the square wave outputs. The final resolution is achieved by increasing the interpolation factor, the number of magnetic poles around the rotor, or the number of sensors. For example, 1024 positions (or 10 bit resolution) can be achieved with four sensors and 128 poles. It can also be achieved using 2 poles and interpolated by a factor of ×256 using two sensors.

If the outputs of two magnetic sensors are sinusoidal, then a net maximum linearity range can be attained when the two signals are in 90° phase difference with each other. The two sinusoidal signals with 90° phase difference can be processed with an arctangent function in order to achieve maximum linearity. Thus, an optimum distance can be determined between the two sensors so that a 90° phase shift can be achieved and there is less linearity error in the system.

The AMS22S by Bourns is an exemplary single turn, magnetic, rotary encoder. The encoder can be programmed to measure rotational angle, which can output a signal either as a linear analogue voltage or a pulse width modulation ("PWM") waveform, in both cases with 12 bit resolution. Other prior art sensor devices include the following:

U.S. Pat. No. 5,351,555 discloses a torque sensor having a magnetoelastically active element, and a magnetic sensor, such as a Hall effect sensor, responsive to the field of the magnetoelastically active portion. The magnetoelastically active portion comprises a ring of material endowed with an effective uniaxial magnetic anisotropy such that the circumferential direction is the easy axis, and magnetically polarized in a substantially circumferential direction. The ring is attached to the torqued member, such as a rotating shaft, so that application of a torque to the shaft is transmitted to the ring. The torque on the ring reorients the circumferential magnetic orientation of the ring, producing a helical magnetic orientation having both circumferential and axial components. A magnetic field vector sensor is mounted on a flux collector in a fixed position relative to the ring and oriented so that it responds to the field arising from the axial component of the magnetization within the ring. The output of the sensor is thus proportional to the change in orientation of the magnetization resulting from torque applied to the shaft and transmitted to the ring.

U.S. Pat. No. 5,815,091 discloses a linear position encoder in which a support is provided upon which a pair of phase quadrature windings are mounted. The windings are arranged to have a sinusoidal magnetic sensitivity characteristic along the length of the support. Mounted on a movable element is a resonant circuit including a coil and capacitor that can magnetically couple with the windings. When the circuit is excited, it induces currents in the windings that are dependent upon the position of the circuit within a period Ts of the windings. An excitation and processing unit is provided to energize the circuit and to process the signals induced in the windings. The encoder may, in a variation, measure rotational or radial position instead of translation.

U.S. Pat. No. 6,323,641 discloses a non-contacting position sensor for measuring position of a rotating object using a Hall effect device that remains stationary in an air gap between a helical flux linkage member and a flux generator, both coupled to the rotating object via a shaft. The flux generator has a ring magnet. The helical flux linkage member varies in thickness from a thin region to a thick region. There is a transition region between where the helical flux linkage member is thickest and where it is thinnest. As the shaft rotates, the Hall effect device senses a magnetic field that varies with the thickness of the helical flux linkage member, thereby measuring the angular position of the rotating object coupled to the shaft.

U.S. Pat. No. 7,367,257 discloses an actuator with a position encoder provided by a helical groove formed in the piston rod. The groove is filled with a material of different magnetic characteristics to provide a smooth exterior surface and a varying discernible signal as the rod moves relative to the cylinder. An array of Hall effect sensors is provided around the rod to provide phase shifted signals as the rod moves so that the signal of one sensor may be correlated by the signals of other sensors.

The prior art however, still fails to disclose a device where the magnetic field pattern is not limited in final pole count and magnet diameter for use with pitched magnetic sensors.

SUMMARY

In one exemplary embodiment, the magnetic encoder system of the present invention comprises a rotor, said rotor having a generally cylindrical shape and an exterior; a first magnetic pole helically disposed about the exterior of said rotor; a second magnetic pole, said second magnetic pole helically disposed about the exterior of said rotor and adjacently to said first magnetic pole, said second magnetic pole having a polarity opposite said first magnetic pole; a first flail sensor, said first Hall sensor disposed within a distance suitable for said first flail sensor to detect said first and said second magnetic poles; a second Hall sensor, disposed within a distance suitable for said second Hall sensor to detect said first and said second magnetic poles, said second Hall sensor disposed relative to said first Hall sensor such that the output of said first Hall sensor is 90° out of phase from said second Hall sensor.

In another exemplary embodiment, the magnetic encoder system of the present invention comprises a magnet for use with a magnetic encoder, said magnet comprising at least two elongate magnetic poles of opposite polarity that are adjacent to each other, each of said magnetic poles extending in its respective longitudinal directions helically on a surface of a rotatable cylinder.

BRIEF DESCRIPTION OF THE DRAWINGS

The present invention will be understood more fully from the detailed description given hereinafter and from the accompanying drawings of the preferred embodiment of the present invention, which, however, should not be taken to limit the invention, but are for explanation and understanding only.

In the drawings.

Corresponding reference characters indicate corresponding parts throughout the several views. The exemplary embodiments set forth herein are not to be construed as limiting the scope of the invention in any manner.

DETAILED DESCRIPTION OF THE EMBODIMENTS

The present invention will be discussed hereinafter in detail in terms of various exemplary embodiments according to the present invention with reference to the accompanying drawings. In the following detailed description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Thus, all of the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
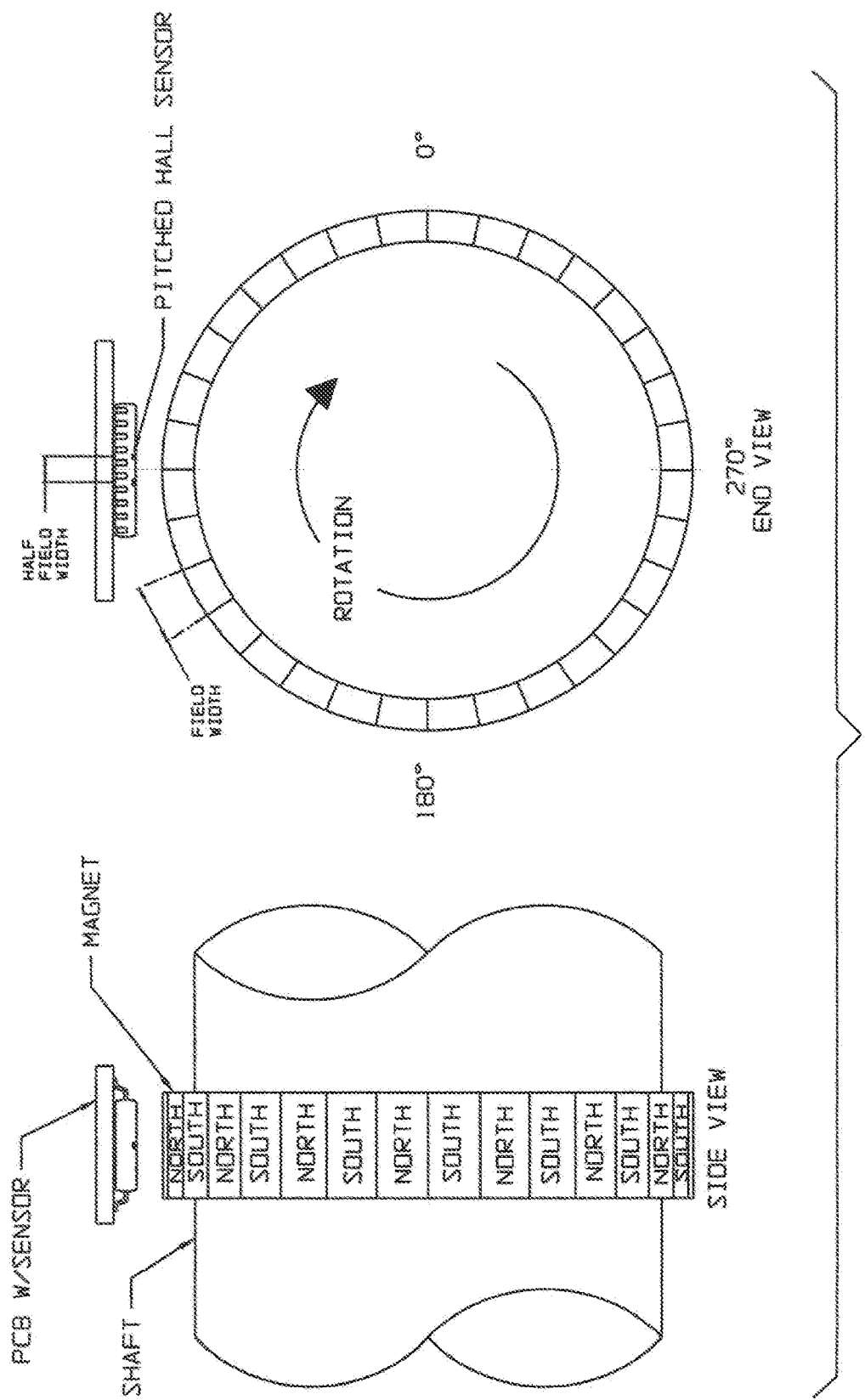
FIG. 1 shows a prior art rotary magnetic encoder with magnetic poles disposed on the periphery of a cylinder.
Figure 2:
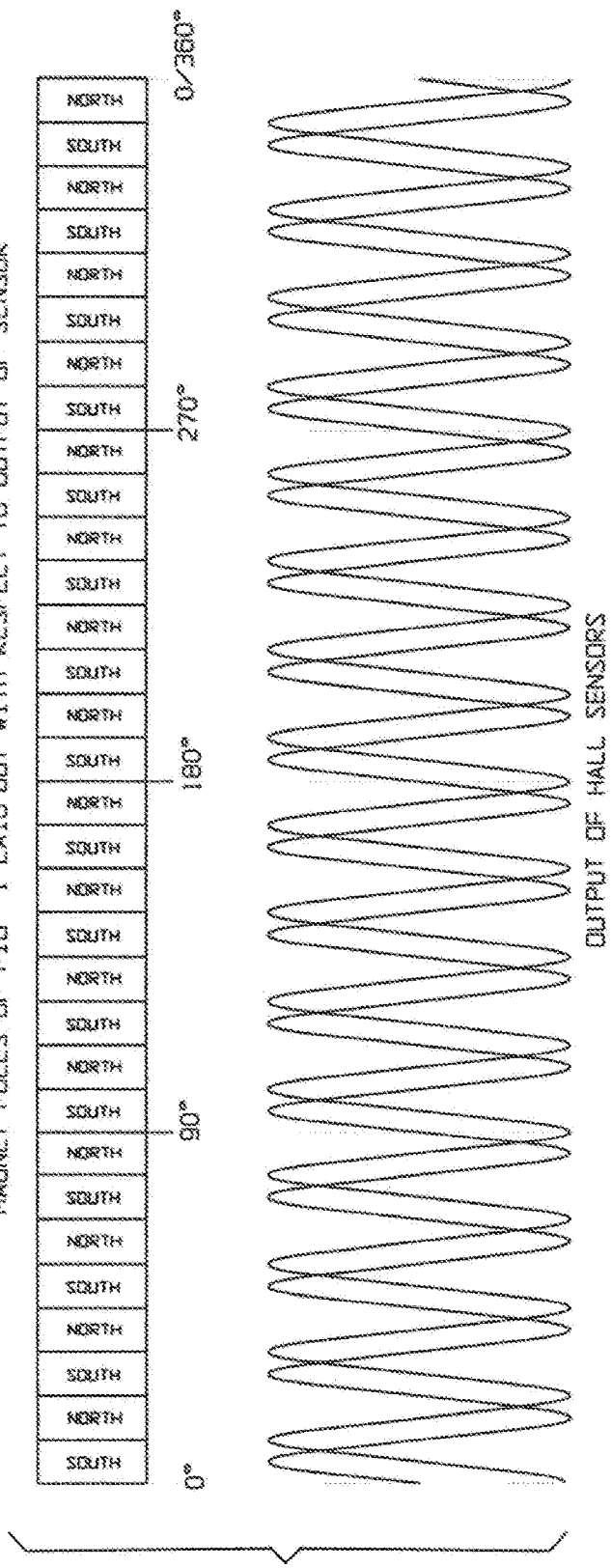
FIG. 2 shows a diagram of the output of the prior art encoder of FIG. 1.

Referring first to FIG. 1, there is shown a side view and an end view of a typical prior art rotary magnetic encoder. As illustrated generally in FIG. 1, a typical rotary magnetic encoder comprises a permanent magnet attached to a rotating shaft so that the shaft has a specific number of alternating symmetrical magnetic poles around its periphery. The encoder further comprises a two-channel magnetic Hall sensor disposed across an air gap at a functional distance with respect to the position of the magnetic poles so that the two channels of output are in quadrature (i.e., simulating a sine and cosine wave) to each other as depicted in FIG. 2. Persons of ordinary skill in the art will appreciate that a "functional distance" is a distance within which the Hall sensor is able to detect the magnetic flux of the magnetic poles. Thus, the functional distance will depend on the sensitivity of the Hall sensors as well as the amount of flux generated by the magnetic poles.

Figure 6:
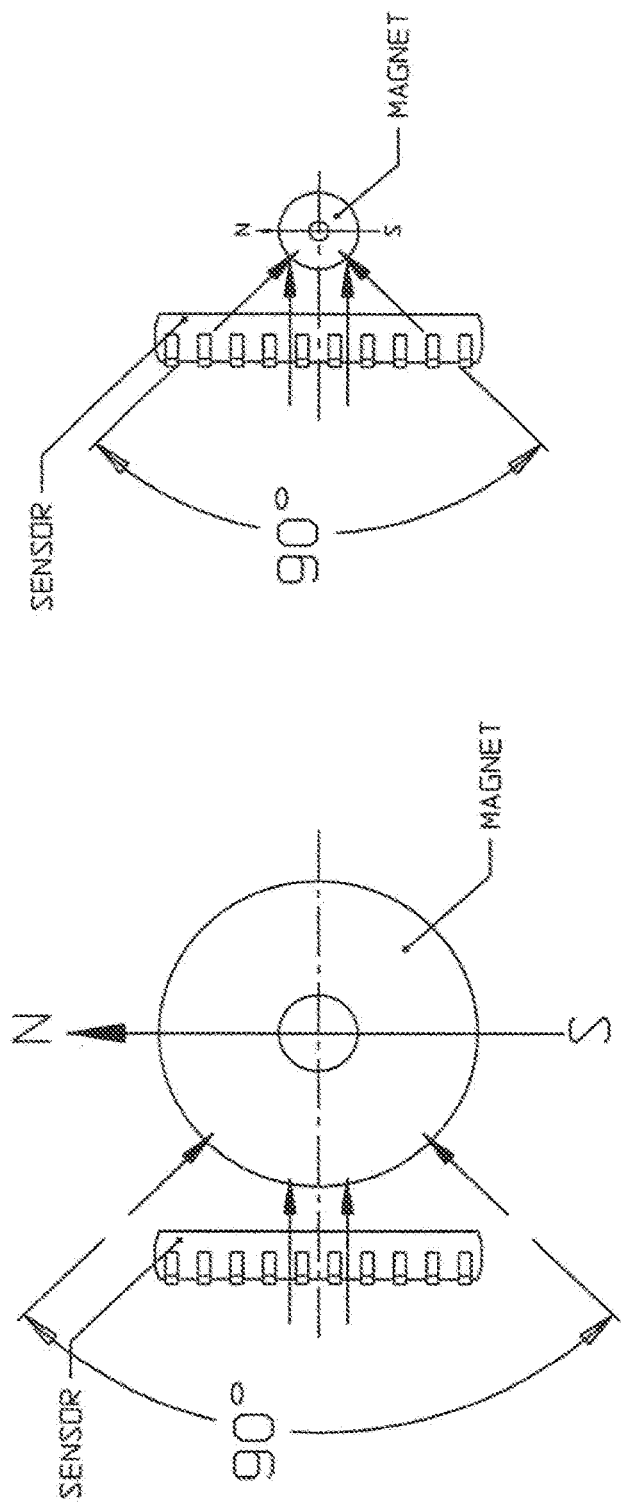
FIG. 6 shows a pair of prior art magnetic sensor arrangements having two magnetic poles each where the sensor is "off axis" compared to the "on axis" arrangement of FIG. 5.

Referring again to FIG. 1, the magnetic poles have a predetermined "field width." When used with a pitched magnetic sensor, the width of the field produced by each pole of a magnet must be in direct relationship to the pitch of the sensor. For Hall sensors, this magnetic pole width is approximately twice the sensor pitch. This field width constant dictates the final number of magnetic poles and changes with the magnet's diameter. Thus, lower pole counts, especially of two poles (one pole pair), are not practical for use with these types of sensors as illustrated in FIG. 6.

Referring again to FIG. 2, there is shown a view of the magnetic poles shown in the side view of FIG. 1 with the magnetic poles displayed along a single line that is analogous to one revolution of the shaft and magnetic pole arrangement shown in FIG. 1. FIG. 2 further shows two exemplary output signals that can be sent directly to a motor controller or similar device for the determination of parameters such as speed and rotational direction of the shaft, or be further processed or interpolated into additional positional data.

Figure 3:
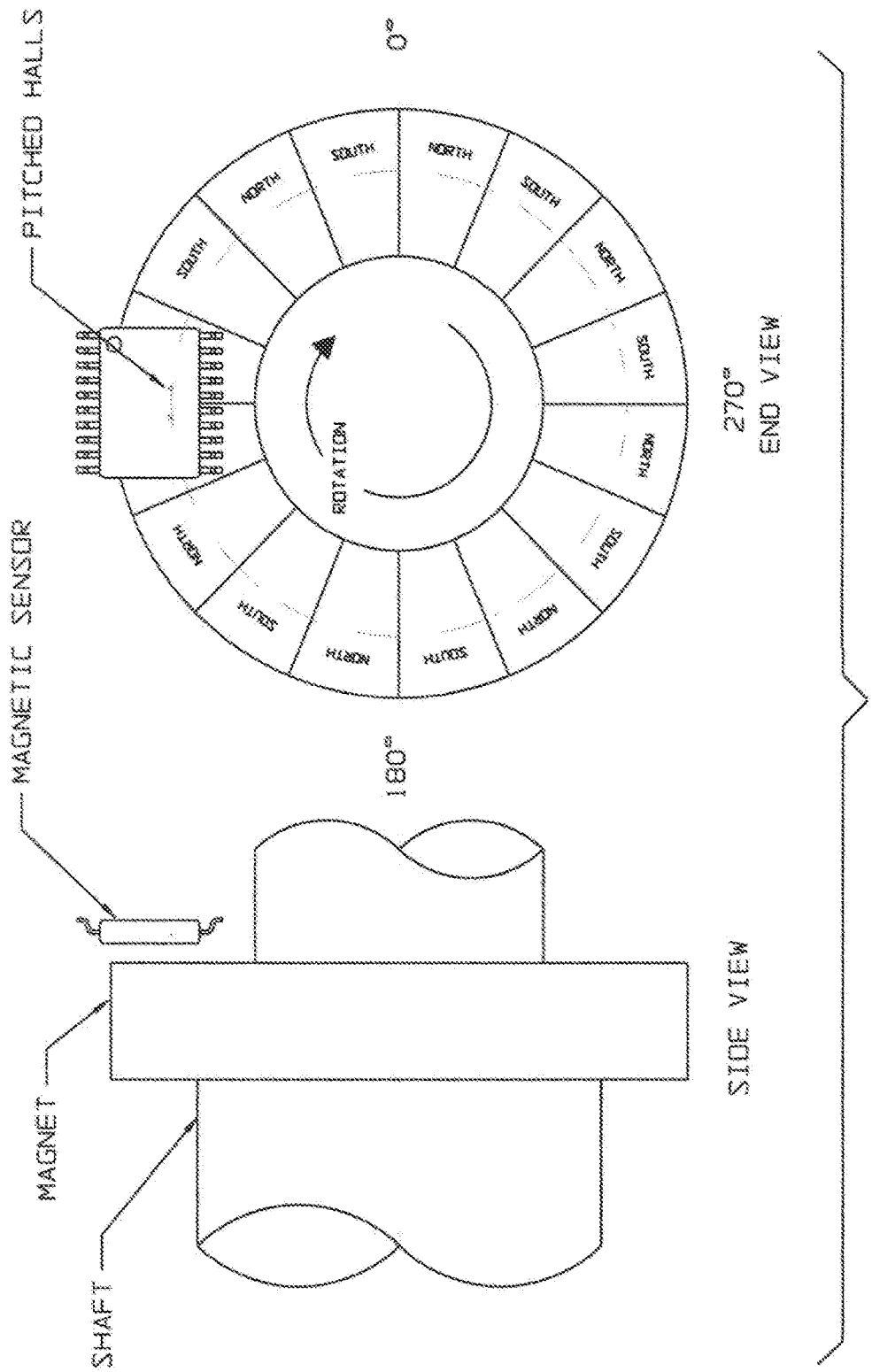
FIG. 3 shows a prior art rotary magnetic encoder with magnetic poles disposed on the face of a cylinder.

Referring next to FIG. 3, there is shown a side view and an end view of a prior art rotary magnetic encoder with magnetic poles disposed on the end of a cylinder. The magnetic poles may be provided circumferentially on the axial end face of a magnet mounted on a rotating shaft, or the magnet may be connected using an adaptor or other device disposed at the end of the shaft. As illustrated in FIG. 3, a pitched Hall sensor is disposed in spaced horizontal juxtaposition relative to one end of the magnet, across an air gap, within a functional distance of the magnetic poles located on the end face of the rotating magnet. Again, persons of ordinary skill in the art will appreciate that a functional distance is a distance within which the Hall sensor detects the magnetic flux of the magnetic poles. Thus, the functional distance will depend on the sensitivity of the Hall sensors as well as the amount of flux generated by the magnetic poles.

Referring still to FIG. 3, each of the magnetic poles has a predetermined "field width." When used with a pitched magnetic sensor, the width of the field produced by each pole of a magnet must be in direct relationship to the pitch of the sensor. For Hall sensors, this magnetic pole width is approximately twice the sensor pitch. This field width constant dictates the final number of magnetic poles and changes with the magnet's diameter. Lower pole counts, especially of two poles (one pole pair), are not practical for use with these types of sensors unless the position of the sensor is directly above the axis of the magnet.

Figure 4:
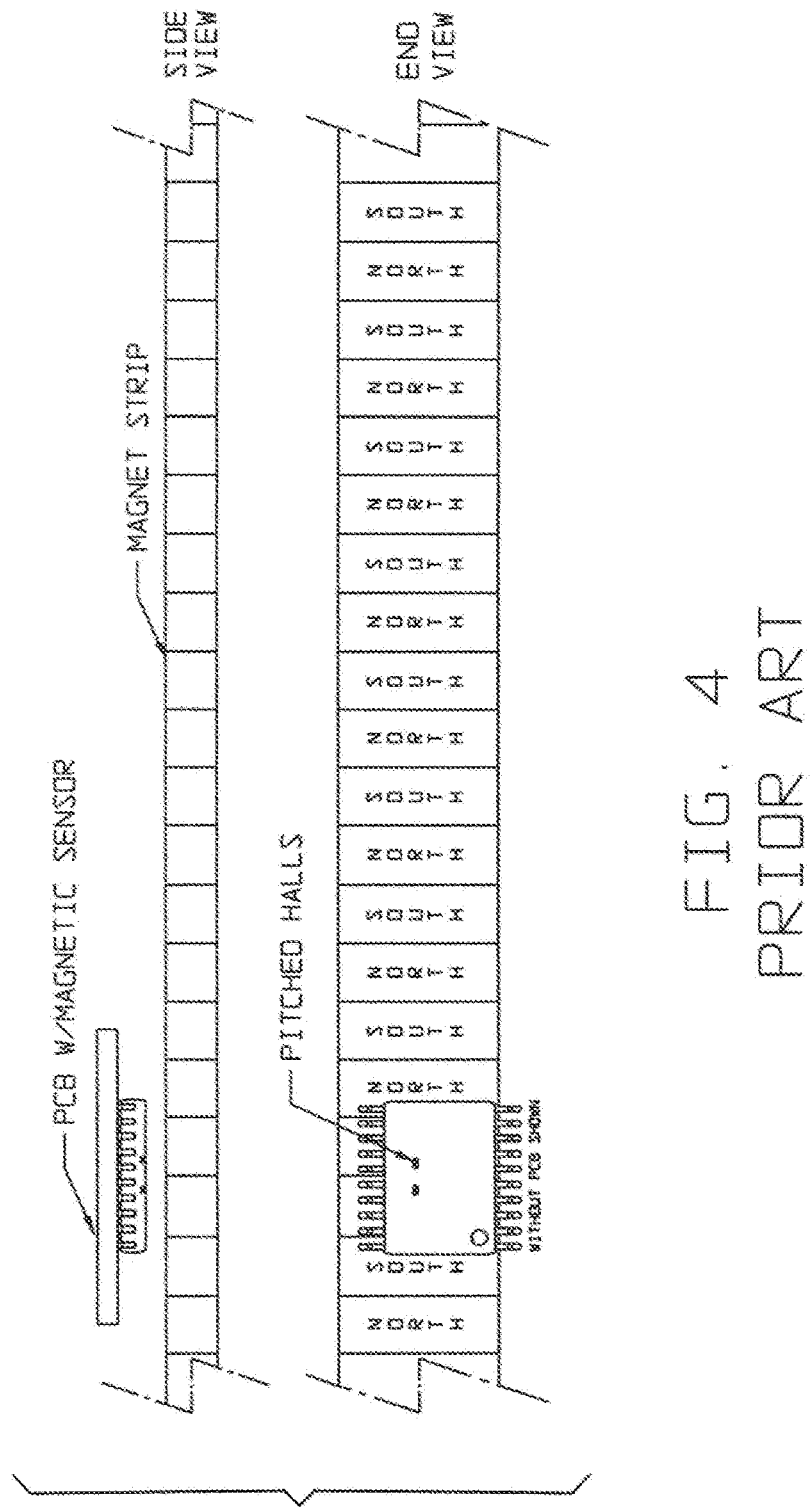
FIG. 4 shows a linear view of the prior art rotary magnetic encoder of FIG. 3.

Referring next to FIG. 4, there is shown a linear view of the prior art rotary magnetic encoder of FIG. 3. Specifically, FIG. 4 illustrates a partial side view and a partial end view of the prior art rotary encoder, with the magnetic poles disposed in a single line along the length of a magnet strip. As in FIG. 3, the pitched Hall sensor of FIG. 4 is disposed within a functional distance of the face/end of a cylinder. When used with a pitched magnetic sensor, the width of the field produced by each pole of a magnet must be in direct relationship to the pitch of the sensor. For Hall sensors, this magnetic pole width is approximately twice the sensor pitch. This field width constant dictates the final number of magnetic poles and changes with the magnet's circumferential length.

Figure 5:
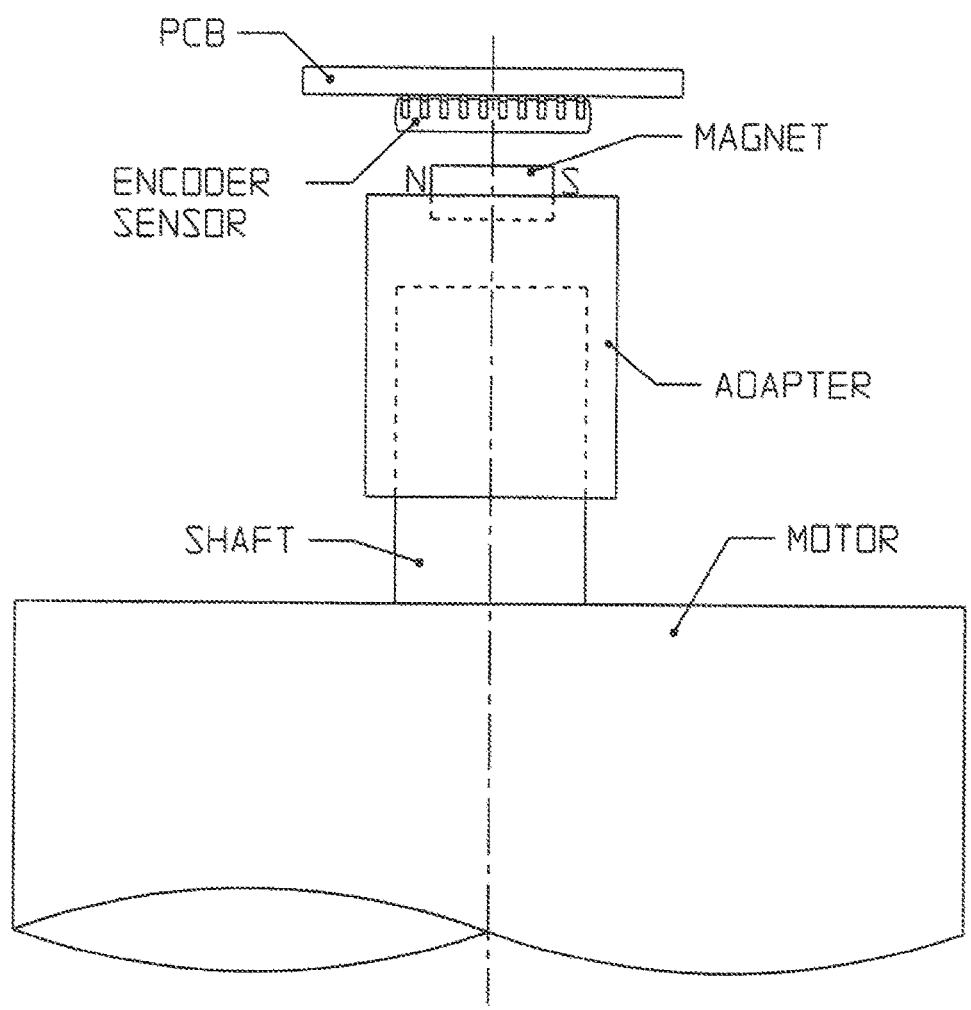
FIG. 5 shows a prior art "end looking" rotary magnetic encoder arrangement.

Referring next to FIG. 5, there is shown a prior art "end looking" magnetic encoder. As illustrated in FIG. 5, a non-contacting magnetic sensor (preferably a Hall sensor) is disposed within a predetermined functional distance from one end of a cylindrical adaptor having a magnet, preferably a magnet with two magnetic poles. The magnet is disposed on one end of a rotating shaft using an adapter. Together, the shaft, adaptor, and magnet form part of a magnetic field sensing assembly. An air gap is shown between the magnet and the Hall sensor. The shaft is either integral with or adapted to be connected to another rotating object such as, for example, a motor shaft, a crankshaft, or a throttle body on a fuel injection system. The shaft rotates about an axis of rotation.

As further illustrated in FIG. 5, the Hall effect sensor is attached to a printed circuit board. The Hall sensor remains stationary while the motorized shaft, magnet and adaptor rotate about the axis of rotation. The Hall sensor may be connected to external circuitry via the printed circuit board. The circuit board provides a means for connection of an output signal that the external circuitry receives for processing. Using the output data, the speed or angular position of the shaft can be determined by known means.

Figure 7:
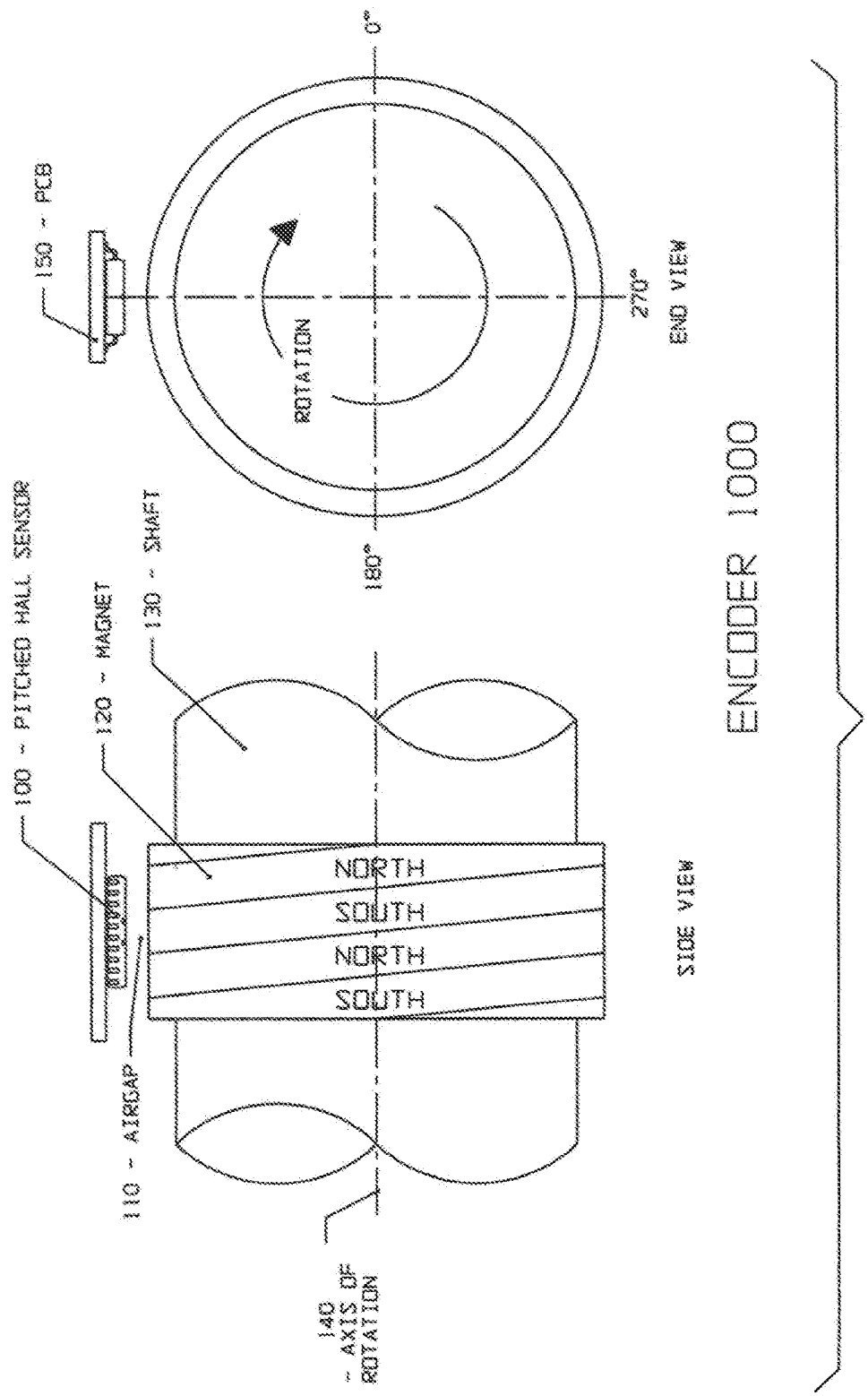
FIG. 7 shows a rotary magnetic encoder according to the present invention with each of its elongate magnetic poles extending in its respective longitudinal directions helically around an external circumferential surface of a cylinder.

Referring now to FIG. 7, there is shown a side view and an end view of an embodiment of a magnetic encoder system 1000 in accordance with the present invention. As illustrated in FIG. 7, magnetic encoder system 1000 generally comprises a rotor which includes cylindrical magnet 120 affixed concentrically to cylindrical shaft 130 and is rotatable about axis of rotation 140. As shown in FIG. 7, magnet 120 includes elongate, north and south magnetic poles that are disposed adjacent to each other, with each elongate magnetic pole extending continuously (i.e., without interruption), rather than continually (i.e., recurringly), in its respective longitudinal directions helically about axis of rotation 140 and the exterior of the magnet. In the depicted embodiment, each of the elongate magnetic poles of magnet 120 extends continuously in its respective longitudinal directions at least 360° about central axis of rotation 140. As shown, the elongate magnetic poles are arranged such that each individual magnetic pole is laterally adjacent to a magnetic pole of opposite polarity, with the longitudinally-extending edges of the adjacent magnetic poles disposed side by side. In the depicted embodiment, the elongate magnetic poles are disposed at a constant radial distance from axis of rotation 140, and traverse cylindrical magnet 120 circumferentially and in directions parallel to axis of rotation 140. Encoder system 1000 further comprises a pitched Hall sensor 100 disposed radially outside of the magnetic poles and the outer circumferential surface of cylindrical magnet 120. An air gap 110 is located between the magnetic poles of magnet 120 and Hall sensor 100. Shaft 130 is either integral with or adapted to be connected to another rotating object (not shown) such as, for example, a motor shaft, a crankshaft, or a throttle body on a fuel injection system.

Figure 12:
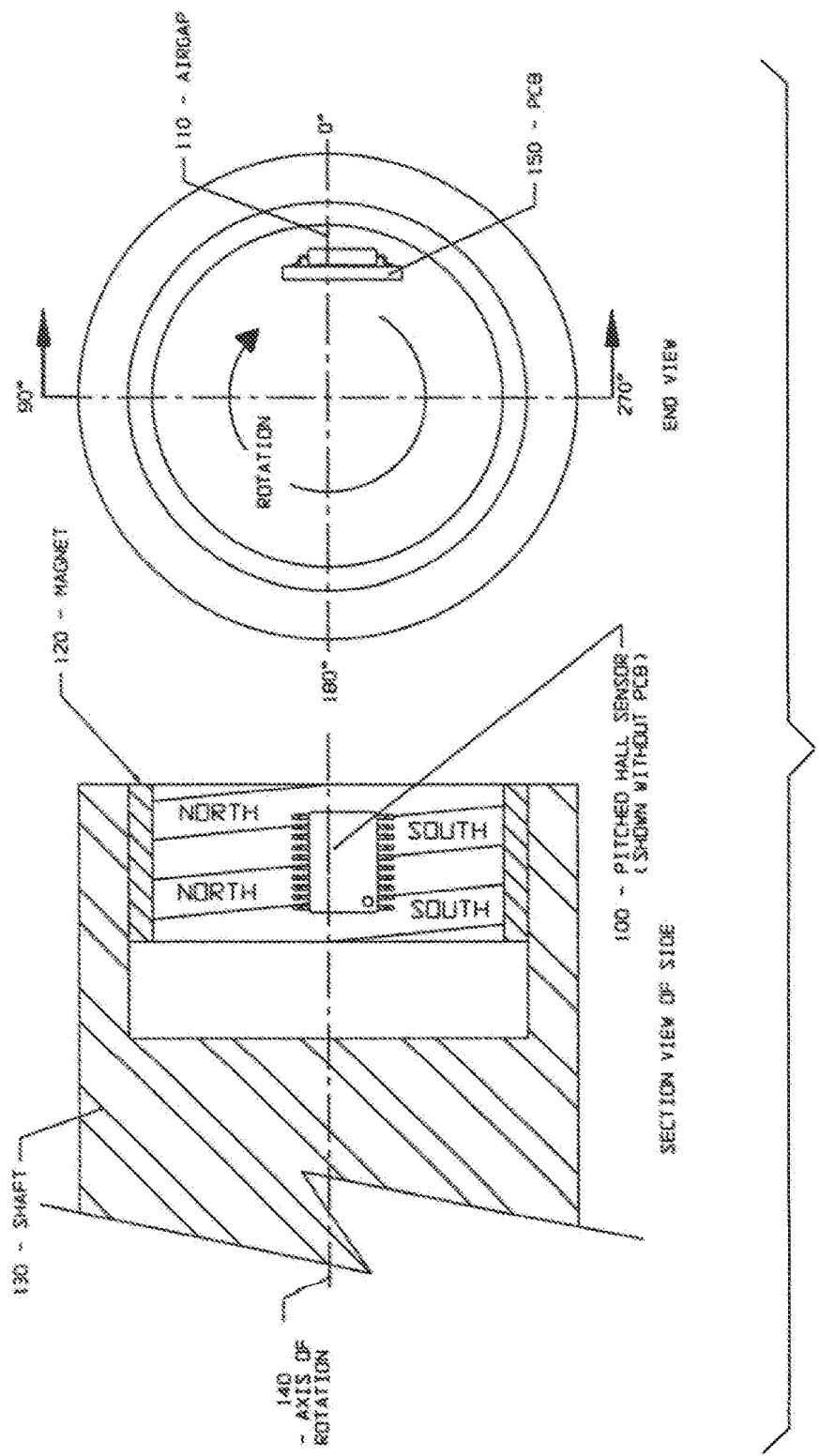
FIG. 12 shows a rotary magnetic encoder according to the present invention with each of its elongate magnetic poles extending in its respective longitudinal directions helically on an internal circumferential surface of a cylinder.

Similar to FIG. 7, FIG. 12 shows a sectional side view and an end view of another embodiment of a rotary magnetic encoder system 1000 in accordance with the present invention. As illustrated in FIG. 12, magnetic encoder system 1000 generally comprises a rotor which includes hollow, cylindrical magnet 120 affixed concentrically to the circumferential surface of a blind, cylindrical bore extending coaxially along axis of rotation 140 from an axial end surface of cylindrical shaft 130. Cylindrical magnet 120 and shaft 130 are coaxial relative to, and rotatable about, axis of rotation 140. As shown in FIG. 12, magnet 120 includes elongate, north and south magnetic poles that are disposed laterally adjacent to each other. In traversing magnet 120 axially and circumferentially, each elongate magnetic pole extends continuously (i.e., without interruption), rather than continually (i.e., recurringly), in its respective longitudinal directions helically about axis of rotation 140 and the inner cylindrical surface of the bore. In the depicted embodiment, each of the elongate magnetic poles of magnet 120 extends continuously in its respective longitudinal directions at least 360° about central axis of rotation 140. As shown, the elongate magnetic poles are arranged such that each individual magnetic pole is laterally adjacent to a magnetic pole of opposite polarity, with the longitudinally-extending edges of the adjacent magnetic poles disposed side by side. In the depicted embodiment of FIG. 12, the elongate magnetic poles are disposed at a constant radial distance from axis of rotation 140, and traverse magnet 120 circumferentially in directions parallel to axis of rotation 140. Encoder system 1000 further comprises a pitched Hall sensor 100 disposed radially inside of hollow, cylindrical magnet 120. An air gap 110 is located between the magnetic poles of magnet 120 and Hall sensor 100. Shaft 130 is either integral with or is adapted to be connected to another rotating object (not shown) such as, for example, a motor shaft, a crankshaft, or a throttle body on a fuel injection system.

Figure 10:
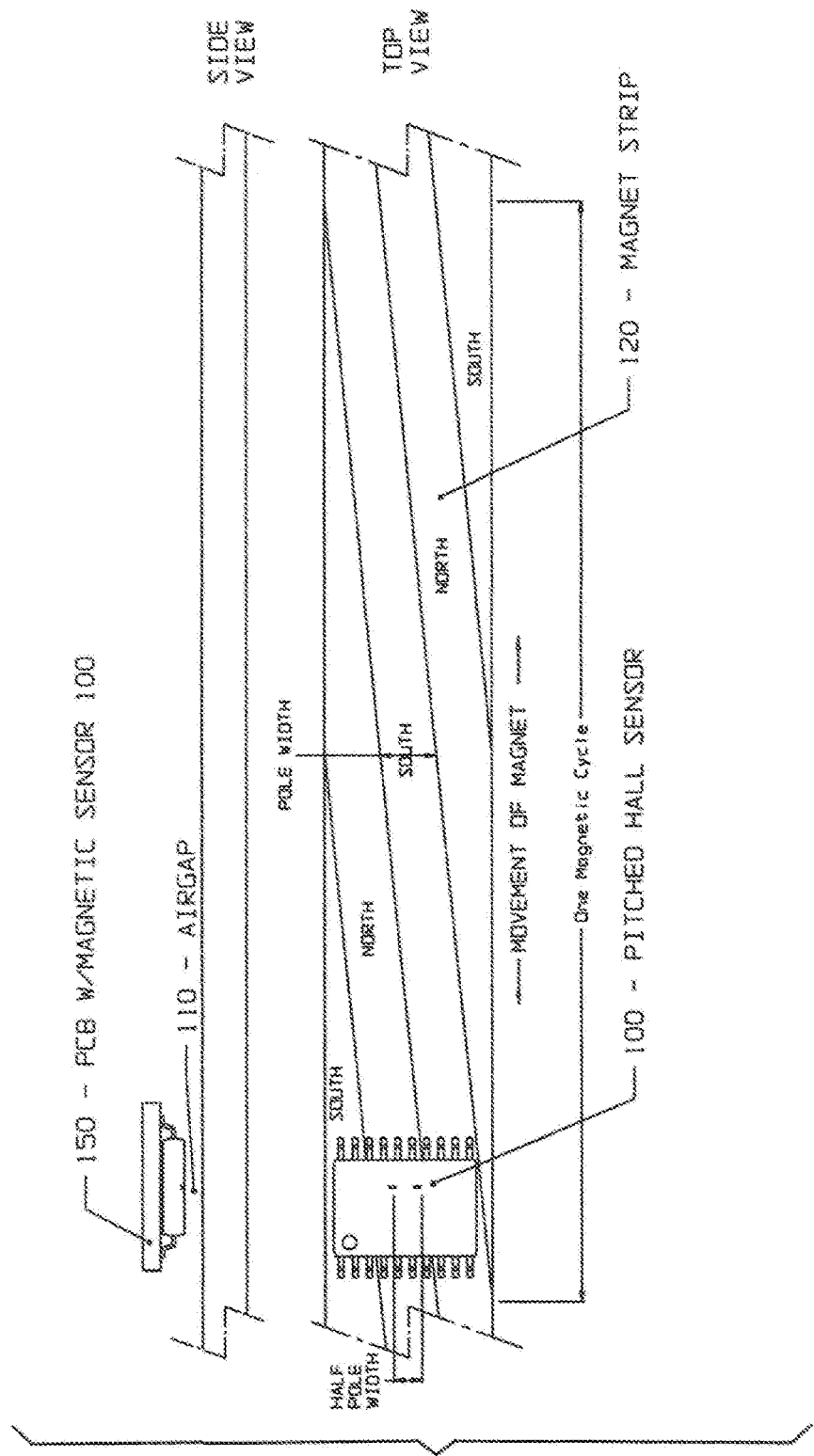
FIG. 10 shows a linear magnetic encoder according to the present invention.
Figure 11:
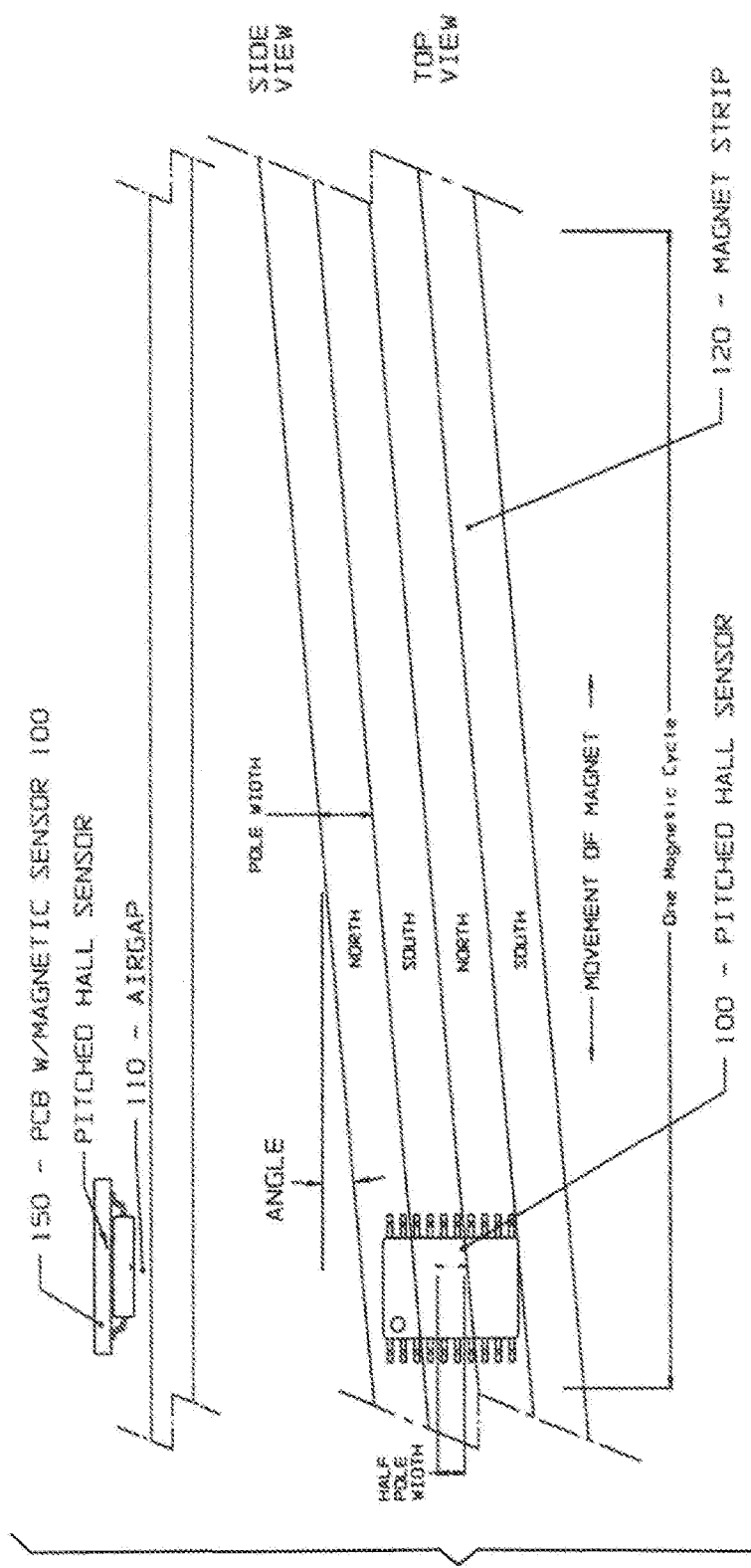
FIG. 11 shows an alternative embodiment of the linear magnetic encoder of FIG. 10.

As illustrated in FIG. 10, a linear magnetic encoder embodiment may be achieved using slanted magnetic stripes. Alternately, as illustrated in the linear magnetic encoder embodiment of FIG. 11, the same effect can be made using straight magnetic stripes but tilting the completed magnet at the correct pitch.

Figure 8:
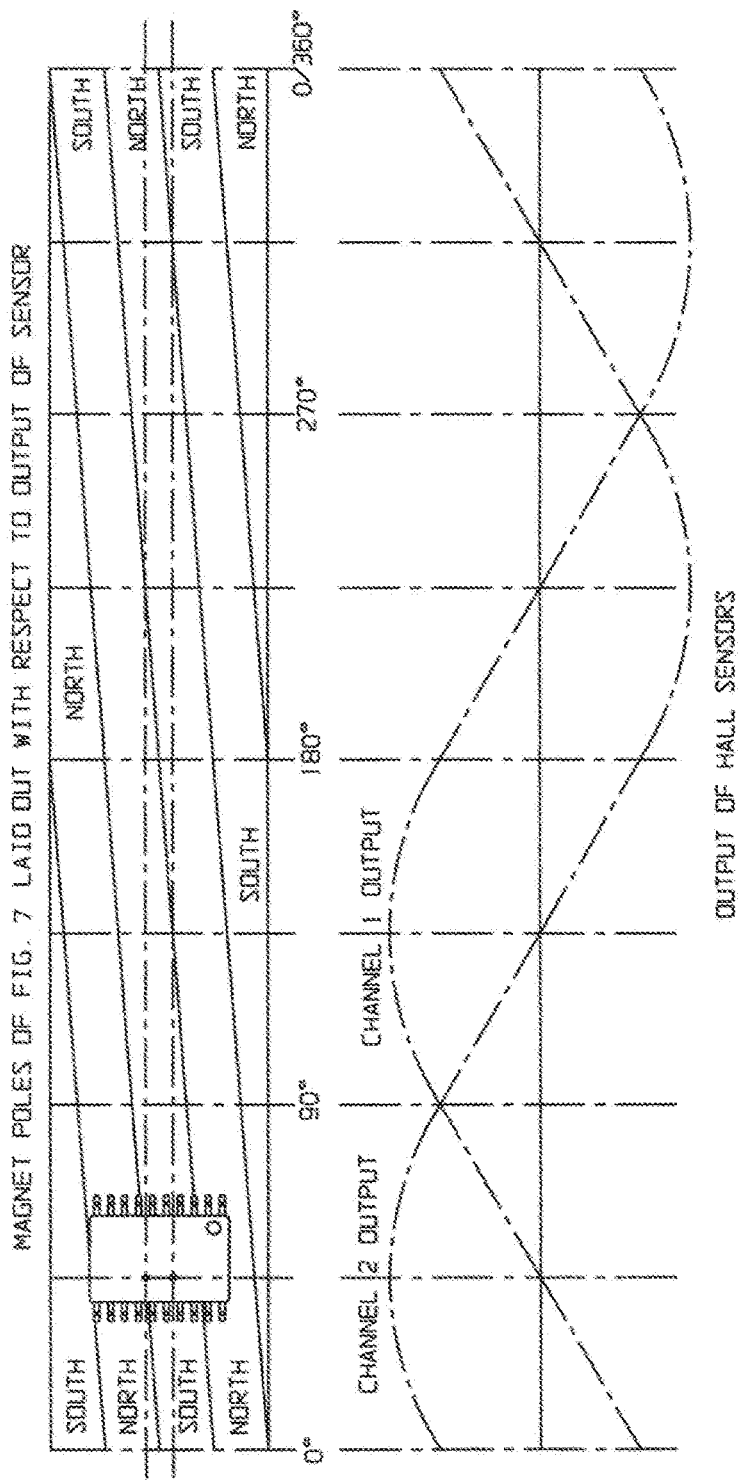
FIG. 8 shows a diagram of the output of the encoder of FIG. 7.

FIG. 8 depicts the output of magnetic encoder system 1000 illustrated in FIG. 7 through FIG. 13. For this example, the spiral pitch is set to simulate a two-pole device for an output equal to one sine and one cosine output of the sensor per either one mechanical revolution or a fixed linear distance. This type of output is typical for absolute but also incremental positioning devices used in applications such as drive by wire, etc., but are not restrained by magnet diameter. More importantly, the sensor does not have to be facing the centerline of the shaft as typically found with prior sensors, thereby providing even more value in an application solution according to the present invention.

Figure 13:
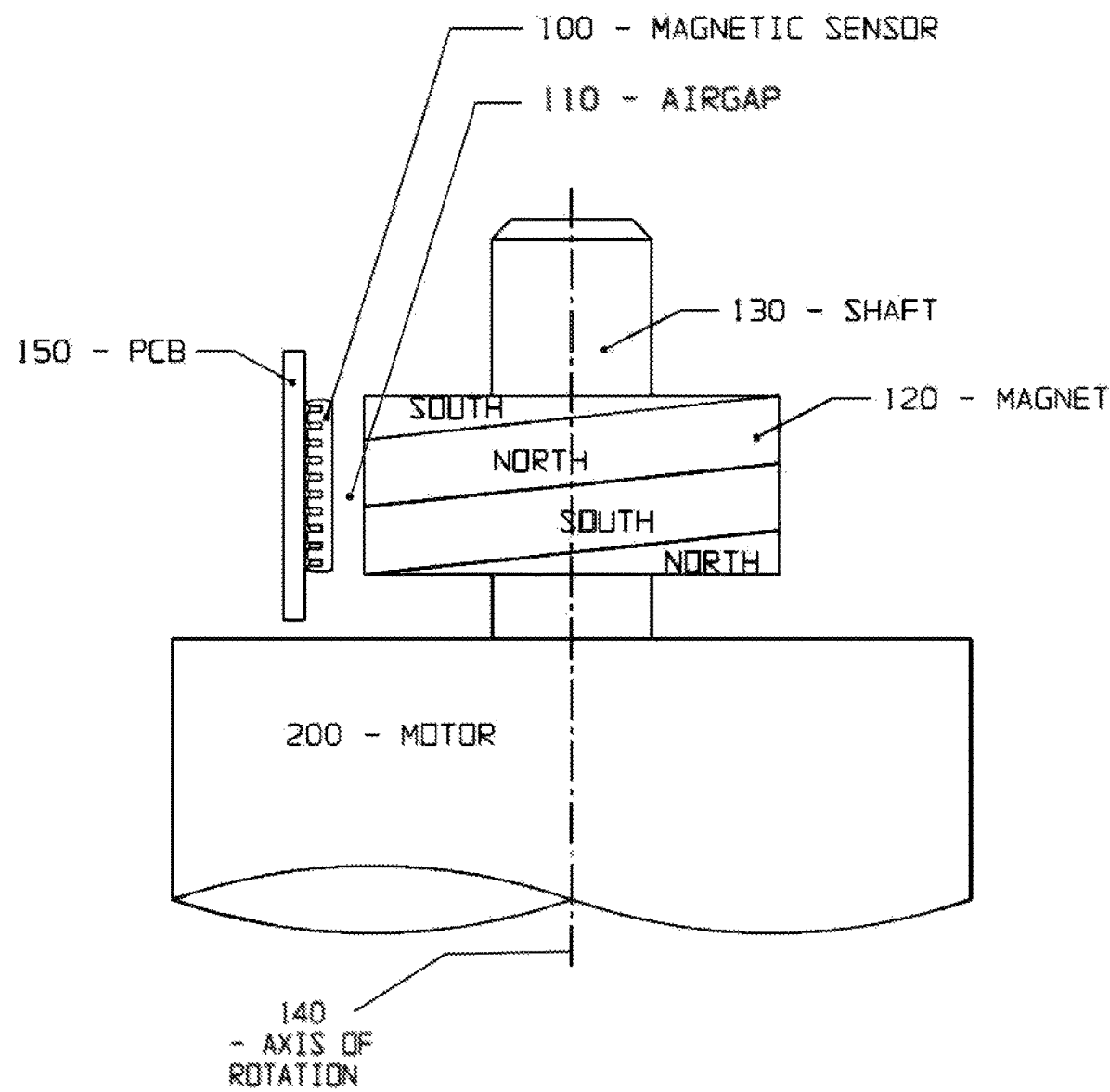
FIG. 13 shows another embodiment of a rotary magnetic encoder according to the present invention.

Referring generally to FIGS. 7, 12, and 13, there are shown a magnetic pole pattern that can be described as a double helix (two-pole version). This double magnetic helix comprises stripes of a pair of north and south magnetic poles extending axially along and circumferentially at a constant radial distance about axis of rotation 140, in a manner similar to the red and white stripes of a barber pole. The magnetic pole width is also a function of 2× the pitch and type of the sensor used. The pole pitch is also a function of the sensor pitch and type. For a two-pole version, the pole pitch is equal to 4× the sensor pitch for a Hall device and 8× the pitch of a magnetoresistive sensor.

Although one sine and cosine cycle works best for absolute encoding, by using other pitches and increasing the number of helical stripes, other pole counts and resolutions can be simulated using this helix field pattern. This pole pattern technique is easily applied to other types of magnetic sensor targets such but not limited to Hall effect devices, and all types of magnetoresistive, inductive and eddy current sensors.

Referring again to FIG. 8, the output signal is a voltage signal substantially proportional to the magnetic field sensed by pitched Hall effect device 100. However, it should be understood that this is not intended as a limitation of the present invention. Depending on the circuitry coupled to Hall effect device 100, the output signal can be either a voltage signal or a current signal and can have any kind of monotonic relation with the magnetic field sensed by Hall effect device 100. The output from Hall effect device 100 is connected to conventional signal processing electronics for amplification, filtering, interpolation algorithms, etc.

Figure 9:
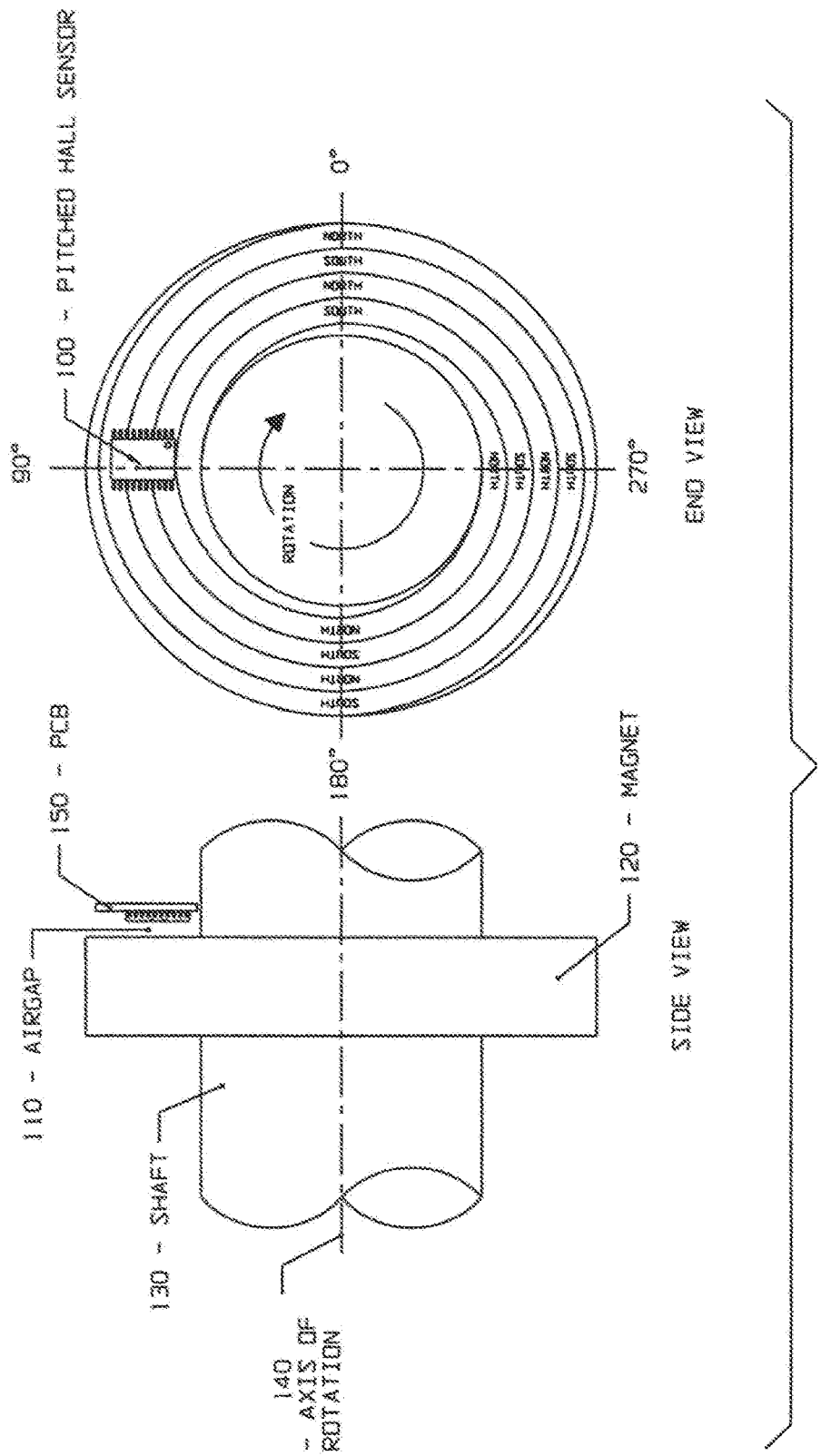
FIG. 9 shows a rotary magnetic encoder according the present invention with each of its elongate magnetic poles extending in its respective longitudinal directions helically on an axial end surface of a cylinder.

Referring now to FIG. 9, there is shown an alternative embodiment of magnetic encoder system 1000 in accordance with the present invention. As illustrated in FIG. 9, magnetic encoder system 1000 generally comprises a rotor including cylindrical magnet 120 affixed concentrically to cylindrical shaft 130 and is rotatable about axis of rotation 140. Magnet 120 includes elongate, north and south magnetic poles that are disposed adjacent to each other. As shown, the elongate magnetic poles are arranged such that each individual magnetic pole is laterally adjacent to a magnetic pole of opposite polarity, with the longitudinally-extending edges of the adjacent magnetic poles disposed side by side. In the embodiment shown in FIG. 9, each elongate magnetic pole extends continuously (i.e., without interruption), rather than continually (i.e., recurringly), in its respective longitudinal directions helically on an annular, axial end surface of cylindrical magnet 120 and about axis of rotation 140. The helically-arranged magnetic poles are disposed substantially in a plane perpendicular to axis of rotation 140. In the depicted embodiment, each of the elongate magnetic poles of magnet 120 extends continuously in its respective longitudinal directions at least 360° about central axis of rotation 140. On the planar annular end surface of cylindrical magnet 120, the elongate magnetic poles extend helically in their respective longitudinal directions about axis of rotation 140 at radial distances therefrom that vary with longitudinal position along each respective magnetic pole's length, as shown in FIG. 9. Oriented as shown in FIG. 9, the depicted embodiment of encoder system 1000 further comprises a pitched Hall sensor 100 disposed in horizontally-spaced juxtaposition relative to the magnetic poles. Air gap 110 is located between the magnetic poles and Hall sensor 100. Shaft 130 is either integral with or adapted to be connected to another rotating object (not shown) such as, for example, a motor shaft, a crankshaft, or a throttle body on a fuel injection system. Shaft 130 may be connected to any actuator capable of initiating rotation of shaft 130 such as an electric motor, combustion engine, gear box, hand crank, conveyor, or bearing system.

Referring again to FIG. 13, there is shown another embodiment of magnetic encoder system 1000 according to the present invention. As illustrated in FIG. 13, system 1000 of the present invention generally comprises motor 200 having vertically projecting shaft 130 which is rotatable about longitudinal axis of rotation 140.

Magnetic encoder system 1000 of FIG. 13 further comprises a rotor which includes cylindrical magnet 120 affixed concentrically to shaft 130 and is rotatable about axis of rotation 140. As shown in FIG. 13, magnet 120 includes elongate, north and south magnetic poles that are disposed adjacent to each other. Each elongate magnetic pole extends continuously (i.e., without interruption), rather than continually (i.e., recurringly), in its respective longitudinal directions helically about axis of rotation 140 and the cylindrical exterior surface of the magnet. In the depicted embodiment, each of the elongate magnetic poles of magnet 120 extends continuously in its respective longitudinal directions at least 360° about central axis of rotation 140. As shown, the elongate magnetic poles are arranged such that each individual magnetic pole is laterally adjacent to a magnetic pole of opposite polarity, with the longitudinally-extending edges of the adjacent magnetic poles disposed side by side. In the depicted embodiment, the elongate magnetic poles are disposed at a constant radial distance from axis of rotation 140, and traverse cylindrical magnet 120 circumferentially and in directions parallel to axis of rotation 140. Encoder system 1000 further comprises a pitched Hall sensor 100 disposed radially outside of the magnetic poles and the outer circumferential surface of cylindrical magnet 120. An air gap 110 is located between the magnetic poles of magnet 120 and Hall sensor 100, and Hall sensor 100 is further connected to a printed circuit board 150. Printed circuit board 150 can be used for communicating output from Hall sensor 100 to conventional signal processing electronics for amplification, filtering, interpolation, etc. The magnetic encoder embodiment of FIG. 13 provides an advantage over the prior art magnetic encoder shown in FIG. 5 in that magnetic sensor 100 of system 1000 is capable of being positioned "off axis," as compared to the "on axis" position required of the magnetic encoder of FIG. 5, and still performing as an absolute magnetic encoder using the single cycle sine and cosine output. That advantage allows the shaft 130 of system 1000 to extend longitudinally past the encoder system for use with other items such as braking systems, etc.

Another unique ability of a magnetic encoder system according to certain embodiments of the present invention is that its helical magnetic pole pattern not only allows it to produce a sine and cosine signal with respect to rotation, but to also produce a sine and cosine signal with respect to any axial movement. By using separate sensors affixed in such a way that one sensor responds to the combination of rotational and axial movements and the other sensor responds to just one of those movements, a processor can be designed to separately determine movements of either type, thereby giving this type of encoder dual purpose.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A magnetic position encoder system, said encoder system comprising:
    a rotor, said rotor having a central axis about which said rotor is operably rotatable and surfaces that define a generally cylindrical shape;
    an elongate first magnetic pole extending continuously in its respective longitudinal directions about the central axis, said first magnetic pole helically disposed on a surface of said rotor, said first magnetic pole having a first magnetic polarity, said elongate first magnetic pole extending continuously in its respective longitudinal directions at least 360° about the central axis;
    an elongate second magnetic pole extending continuously in its respective longitudinal directions about the central axis, said second magnetic pole helically disposed on said surface of said rotor and adjacently to said first magnetic pole, said second magnetic pole having a second magnetic polarity that is opposite to said first magnetic polarity, said elongate second magnetic pole extending continuously in its respective longitudinal directions at least 360° about the central axis;
    a first Hall sensor, said first Hall sensor disposed within a distance suitable for said first Hall sensor to detect said first and said second magnetic poles; and
    a second Hall sensor, disposed within a distance suitable for said second Hall sensor to detect said first and said second magnetic poles, said second Hall sensor disposed relative to said first Hall sensor such that the output of said first Hall sensor is 90° out of phase from said second Hall sensor.

2. The system of claim 1, wherein the system further comprises an actuating apparatus operatively connected to said rotor, said actuating apparatus selected from the group consisting of an electric motor, a hydraulic motor, a crank, an internal combustion engine, conveyor, gear box, and a bearing system.

3. The system of claim 1, wherein the system further comprises a printed circuit board connected to said Hall sensors.

4. The system of claim 1, wherein said surface of said rotor on which said magnetic poles are disposed is selected from the group consisting of an axial end surface of said rotor, an outer circumferential surface of said rotor, and an inner circumferential surface of said rotor.

5. The system of claim 1, wherein the system comprises a magnet having at least two magnetic poles adapted to be adjacently and longitudinally disposed around a circumferential surface of said rotor in a helical magnetic pole pattern relative to a said sensor.

6. The system of claim 5, wherein said helical magnetic pole pattern comprises slanted magnetic pole stripes.

7. The system of claim 5, wherein said helical magnetic pole pattern comprises straight magnetic strips tilted at a predetermined pitch.

8. A rotor for use with a sensor in a magnetic position encoder system,
wherein said rotor comprises a cylindrical magnet having a circumferential surface and a central axis, said rotor is operably rotatable about said central axis, and said circumferential surface is disposed about said central axis; and
wherein said magnet comprises at least two elongate magnetic poles of opposite polarity that are laterally adjacent to each other, each said magnetic pole extending continuously in its respective longitudinal directions helically about said central axis on a surface of the cylindrical magnet, each said elongate magnetic pole extending continuously in its respective longitudinal directions at least 360° about said central axis.

9. The rotor of claim 8, wherein said at least two magnetic poles are adjacently and helically disposed on an outer circumferential surface of the cylindrical magnet.

10. The rotor of claim 8, wherein said at least two magnetic poles are adjacently and helically disposed on an inner circumferential surface of the cylindrical magnet.

11. The rotor of claim 10, wherein said cylindrical magnet is disposed on an inner circumferential surface of a bore that extends along the central axis.

12. The rotor of claim 8, wherein each said magnetic pole extends on said circumferential surface in directions along, and circumferentially at a substantially constant radial distance about, said central axis.

13. The rotor of claim 8, wherein said surface of the cylindrical magnet on which said at least two magnetic poles helically extend is an axial end surface of the cylindrical magnet.

14. A rotor for use with a sensor in a magnetic position encoder system, said rotor comprising a cylinder having a central axis, and at least two elongate magnetic poles of opposite polarity that are laterally adjacent to each other and extend continuously in their respective longitudinal directions in a helical magnetic pole pattern on a surface of the cylinder, each said magnetic pole extending in directions along the central axis, each said magnetic pole extending circumferentially at a substantially constant radial distance about the central axis, each said elongate magnetic pole extending continuously in its respective longitudinal directions at least 360° about the central axis.

15. The rotor of claim 14, wherein said helical magnetic pole pattern comprises slanted magnetic pole stripes.

16. The rotor of claim 14, wherein said helical magnetic pole pattern comprises straight magnetic strips tilted at a predetermined pitch.

17. A rotor for use with a sensor in a magnetic position encoder system, said rotor defining a cylinder having a central axis and comprising at least two elongate magnetic poles of opposite polarity that are laterally adjacent to each other, each said magnetic pole extending continuously in its respective longitudinal directions helically about said central axis on an axial end surface of the cylinder.

18. A magnetic position encoder system, said encoder system comprising:
a rotor, said rotor having an axis of rotation and surfaces that define a generally cylindrical shape;
an elongate first magnetic pole extending continuously in its respective longitudinal directions about said axis of rotation, said first magnetic pole helically disposed on a surface of said rotor, said first magnetic pole having a first magnetic polarity, said elongate first magnetic pole extending continuously in its respective longitudinal directions at least 360° about said axis of rotation;
an elongate second magnetic pole extending continuously in its respective longitudinal directions about said axis of rotation, said second magnetic pole helically disposed on said surface of said rotor and adjacently to said first magnetic pole, said second magnetic pole having a second magnetic polarity that is opposite to said first magnetic polarity, said elongate second magnetic pole extending continuously in its respective longitudinal directions at least 360° about said axis of rotation; and
a first magnetic sensor, said first magnetic sensor disposed within a distance suitable for said first magnetic sensor to detect said first and said second magnetic poles.

19. The system of claim 18, wherein said first magnetic sensor is a pitched magnetic sensor.

20. The system of claim 18, wherein said first magnetic sensor is selected from the group consisting of a Hall effect sensor; a magnetoresistive sensor, an inductive sensor; and an eddy current sensor.

21. The system of claim 18, further comprising:
a second magnetic sensor, disposed within a distance suitable for said second magnetic sensor to detect said first and said second magnetic poles, said second magnetic sensor disposed relative to said first magnetic sensor such that the output of said first magnetic sensor is 90° out of phase from said second magnetic sensor.

22. The system of claim 21, wherein said second magnetic sensor is a pitched magnetic sensor.

23. The system of claim 21, wherein said second magnetic sensor is selected from the group consisting of: a Hall effect sensor; a magnetoresistive sensor, an inductive sensor; and an eddy current sensor.

24. The system of claim 18, further comprising:
a second magnetic sensor, said second magnetic sensor disposed within a distance suitable for said second magnetic sensor to detect said first and second magnetic poles;

wherein said first and second magnetic sensors have mutually relative positions in which said magnetic sensors are capable of producing a pair of output signals.

25. The system of claim 24, wherein the magnetic sensors are adapted to produce output signals that are 90° out of phase with each other.

26. The system of claim 24, wherein the magnetic sensors are adapted to produce a sine output signal and a cosine output signal.

* * * * *